United States Patent
Miyazaki et al.

(10) Patent No.: US 8,135,971 B2
(45) Date of Patent: Mar. 13, 2012

(54) DATA PROCESSING APPARATUS

(75) Inventors: Sadao Miyazaki, Kawasaki (JP);
Osamu Ishibashi, Kawasaki (JP);
Rikizo Nakano, Kawasaki (JP);
Yoshinori Mesaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 335 days.

(21) Appl. No.: 12/495,991

(22) Filed: Jul. 1, 2009

(65) Prior Publication Data

US 2010/0058094 A1 Mar. 4, 2010

(30) Foreign Application Priority Data

Aug. 29, 2008 (JP) ................. 2008-222243

(51) Int. Cl.
*G06F 1/00* (2006.01)
(52) U.S. Cl. ........................ 713/323; 711/100
(58) Field of Classification Search .......... 713/320–344; 710/100
See application file for complete search history.

(56) References Cited

U.S. PATENT DOCUMENTS

| | | | |
|---|---|---|---|
| 5,511,183 A | 4/1996 | Ohmido | |
| 5,729,679 A | 3/1998 | Nelson | |
| 5,931,951 A * | 8/1999 | Ando | 713/324 |
| 7,523,331 B2 * | 4/2009 | Van Der Heijden | 713/323 |
| 2003/0233525 A1 | 12/2003 | Reeves | |
| 2005/0080762 A1 | 4/2005 | Nakashima et al. | |

FOREIGN PATENT DOCUMENTS

| | | |
|---|---|---|
| JP | 6-251570 A | 9/1994 |
| JP | 7-253935 A | 10/1995 |

OTHER PUBLICATIONS

Chinese Office Action dated Apr. 7, 2011, issued in corresponding Chinese Patent Application No. 200910160920.9.

* cited by examiner

*Primary Examiner* — Brian Misiura
*Assistant Examiner* — Kim Huynh
(74) *Attorney, Agent, or Firm* — Westerman, Hattori, Daniels & Adrian, LLP

(57) ABSTRACT

A data processing apparatus includes a CPU including a register, a cache memory, a main memory configured to exchange data with the cache memory, a control part configured to control the exchanging of data between the main memory and the cache memory, and a power supply part configured to supply power to the register, the cache memory, and the main memory. The register, the cache memory, and the main memory are each configured to store data and maintain the stored data therein without being supplied with the power from the power supply part. The control part is configured to stop the CPU from accessing the register, the cache memory, and the main memory where an abnormality occurs in the power supply part.

6 Claims, 7 Drawing Sheets

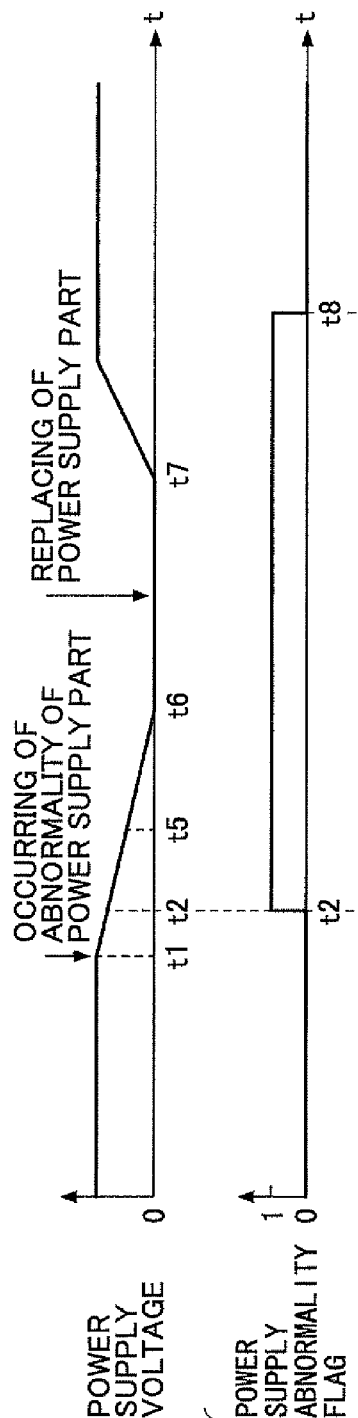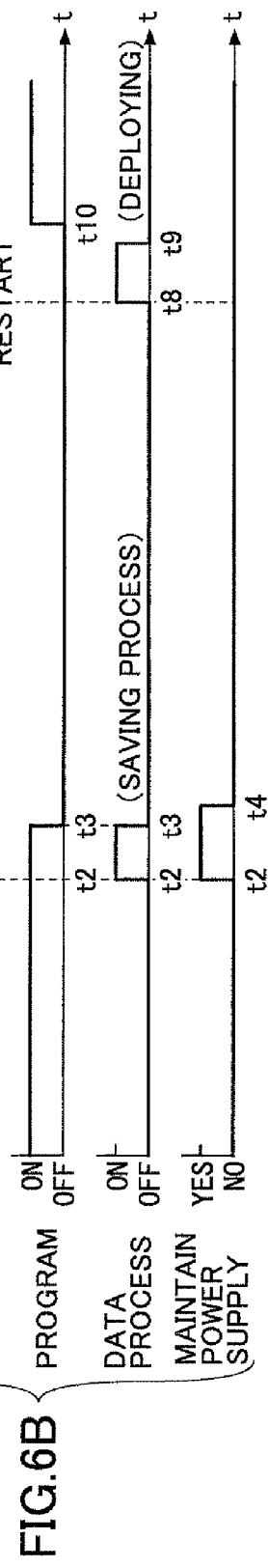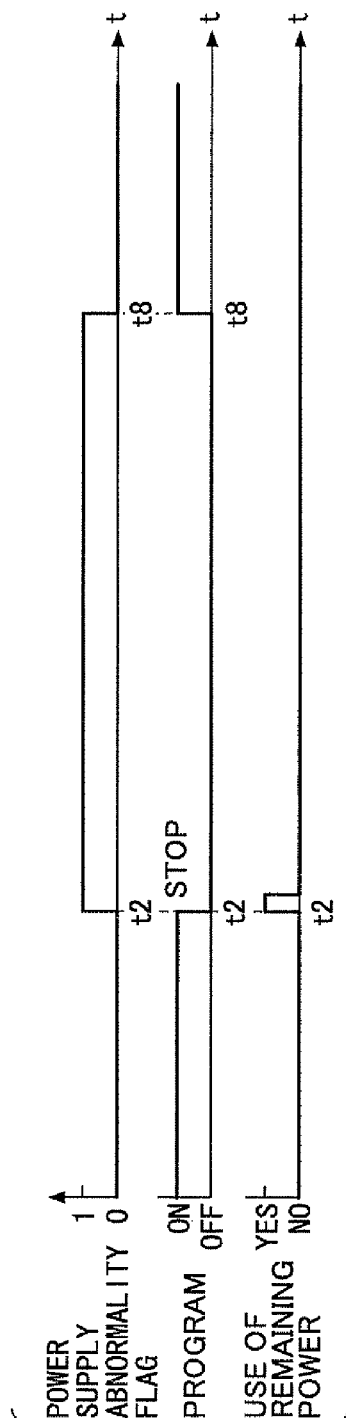

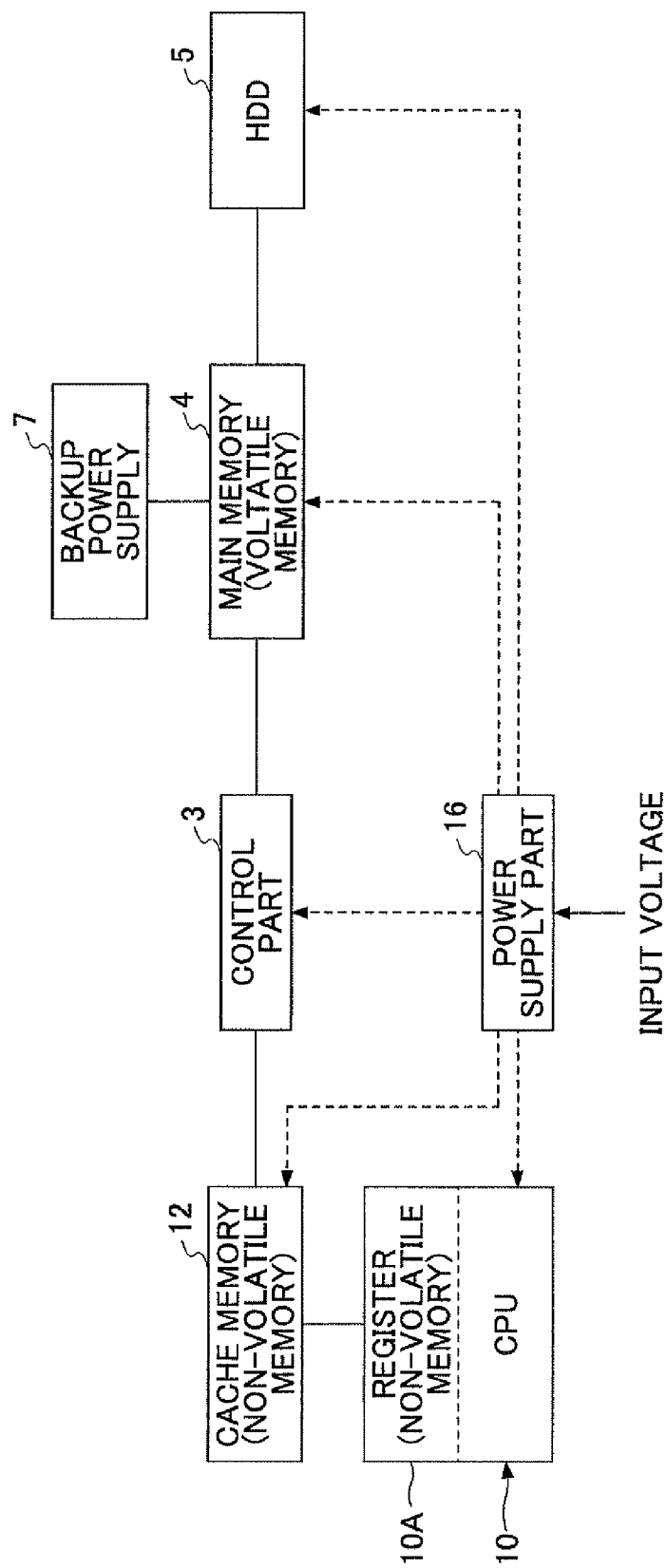

DATA PROCESSING APPARATUS

CROSS-REFERENCE TO RELATED APPLICATIONS

This application is based upon and claims the benefit of priority of the prior Japanese Patent Application No. 2008-222243 filed on Aug. 29, 2009, the entire contents of which are incorporated herein by reference.

FIELD

The embodiments discussed herein are related to a data processing apparatus that does not require saving of data even where abnormality of the power source occurs.

BACKGROUND

FIG. 1 is a schematic diagram illustrating a configuration of a data processing apparatus 100 according to a related art example. The data processing apparatus 100 of the related art example includes a CPU (Central Processing Unit) 1, a cache memory 2, a control part 3, a main memory 4, a HDD (hard disk drive) 5, and a power source part 6. The cache memory 2, the control part 3, the main memory 4, and the HDD 5 are connected by a bus.

The CPU 1 reads, for example, a program or data stored in the HDD 5, performs a calculating process according to the program, and outputs a result of the calculation. The CPU 1 includes a register 1A which temporarily stores data such as data of addresses used when reading/writing from/to the calculation result or main memory 4.

Typically, a volatile register is used as the register 1A.

The cache memory 2, which is a high, speed small capacity memory that temporarily stores data, is connected to the CPU 1. Typically, a volatile memory is used as the cache memory 2.

The control part 3, which is controlled by the CPU 1, controls the sending/receiving of data between the cache memory 2 and the main memory 4.

The main, memory 4 reads data to be used by the CPU 1 from the HDD 5 and temporarily stores the read data. Typically, a volatile memory such, as DRAM (Dynamic RAM: a read/write memory that periodically requires a memory maintaining action such as refresh) is used as the main memory 4.

The HDD 5 is a large capacity storage apparatus for storing data such as programs required by the CPU 1 for performing a calculating process and data of the calculation results.

The power supply part 6 converts the voltage value of the voltage supplied from an external power supply and supplies electric power to the CPU 1, the register 1A, the cache memory 2, the control part 3, the main memory 4, and the HDD 5. The power supply part 6 is a large capacity condenser (capacitor) serving to maintain a power supply for reserving electric power required during a period of performing a data saving process (described below) in a case where an abnormality occurs in the power supply part 6. It is to be noted that the voltage value of the power supply part 6 is constantly monitored by the CPU 1.

Accordingly, with the data processing apparatus 100, the main memory 4 reads necessary programs and data stored in the HDD 5 and the CPU 1 performs various calculating processes using the programs and data stored in the main memory 4.

FIG. 2 is a flowchart, for describing processes performed by the CPU 1 where an abnormality occurs in a power supply system of the power supply part 6 of the data processing apparatus 100 according to the related art example.

The CPU 1 determines whether there is a decrease in the value of the voltage supplied from the power supply part 6 due to an abnormality (e.g., malfunction, power outage) based on the monitoring results input from the power supply part 6 (Step S1). Step S1 is repeated until a decrease in the value of the voltage supplied from, the power supply part 6 occurs.

In a case where the CPU 1 determines that there is a decrease in the value of the voltage supplied from the power supply part 6, the CPU 1 sets a power supply abnormality flag to "1" (Step S2).

The CPU 1 executes a data saving process in which data stored in the register 1A and data stored in the cache memory 2 are saved in the HDD 5. Then, the CPU 1 determines whether the data saving process is completed by determining whether the stored data of the register 1A and the stored data of the cache memory 2 have been stored in the HDD 5 (Step S3). Step S3 is repeated until the CPU 1 determines that the process of saving the stored data of the register 1A and the cache memory 2 into the HDD 5 is completed.

When the CPU 1 determines that the data have been stored in the HDD 5, the CPU 1 stores a process history of the CPU 1 in the HDD 1 (Step S4).

Then, the CPU 1 executes another data saving process in which data stored in the main memory 4 are saved in the HDD 5. Then, the CPU 1 determines whether the data saving process is completed (Step S5). Step S5 is repeated until the CPU 1 determines that the process of saving the stored data of the main memory 4 into the HDD 5 is completed.

Then, the CPU 1 stops all processes that are being executed (Step S6).

The processes are stopped so that the power supply part 6 can be, for example, replaced or repaired.

After the repairing or replacing of the power supply part 6 is completed, the data processing apparatus 100 is restarted. When the data processing apparatus 100 is restarted, the CPU 1 determines whether the power supply abnormality flag is "1" (Step S7). Step S7 is for determining whether a decrease of the value of the voltage of the power supply part 6 has occurred previous to the restarting of the data processing apparatus 100.

The CPU 1 deploys the stored data saved in the HDD 5 to the register 1A, the cache memory 2, and the main memory 4. Then, the CPU 1 determines whether the data deploying process is completed (Step S8). Step S8 is repeated until the CPU 1 confirms that the data deploying process is completed.

The CPU 1 resumes to a process that was being executed until the occurrence of the abnormality of the power saving part 6 (resuming of continuing program) (Step S9).

Accordingly, the data saving process and the restarting process where abnormality occurs in the power supply part 6 are completed. The power required during a period of the data saving process after the abnormality of the power supply part 6 is supplied from a large capacity condenser (capacitor) provided inside the power supply part 6 for maintaining power.

A data processing apparatus 300 according to another related art example is illustrated in FIG. 3. The data processing apparatus 300 is provided with a backup power supply (e.g., backup battery) 7 for supplying backup power to the main memory 4, so that data stored in the main memory (DRAM) 4 can be protected where an abnormality occurs in the power supply part 6.

Since approximately several seconds to several tens of seconds is required for performing the above-described data saving process, a large capacity condenser is necessary for maintaining power. Such a necessity results in an increase in the size and cost of the data processing apparatus 100, 300 of the related art examples. Particularly, since the main memory 4 has larger memory capacity than the register 1A or the cache memory 2, a long time is required in performing the data saving process for the main memory 4.

Further, in a restarting process after the recovery of the power supply part 6, the data processing apparatus 100, 300 of the related art examples cannot be immediately used due to the long time required in deploying the saved data. Particularly, in a case where immediate recovery of the data processing apparatus 100, 300 of the related art examples is required (e.g., a case where the data processing apparatus 100, 300 is for an institution used by many users), prompt recovery of the data processing apparatus 100, 300 is required for meeting the demands of the users.

SUMMARY

According to an aspect of the invention, there is provided a data processing apparatus including a CPU including a register, a cache memory, a main memory configured to exchange data with the cache memory, a control part configured to control the exchanging of data between the main memory and the cache memory, and a power supply part configured to supply power to the register, the cache memory, and the main memory, wherein the register, the cache memory, and the main memory are each configured to store data and maintain the stored data therein without being supplied with the power from the power supply part, wherein the control part is configured to stop the CPU from accessing the register, the cache memory, and the main memory where an abnormality occurs in the power supply part.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

BRIEF DESCRIPTION OF DRAWINGS

FIGS. 6A-6C are diagrams for describing an operation of a data processing apparatus according to the first embodiment of the present invention; and FIG. 7 is a block diagram illustrating a configuration of a data processing apparatus according to a second embodiment of the present invention.

DESCRIPTION OF EMBODIMENTS

[First Embodiment]

Figure 1:
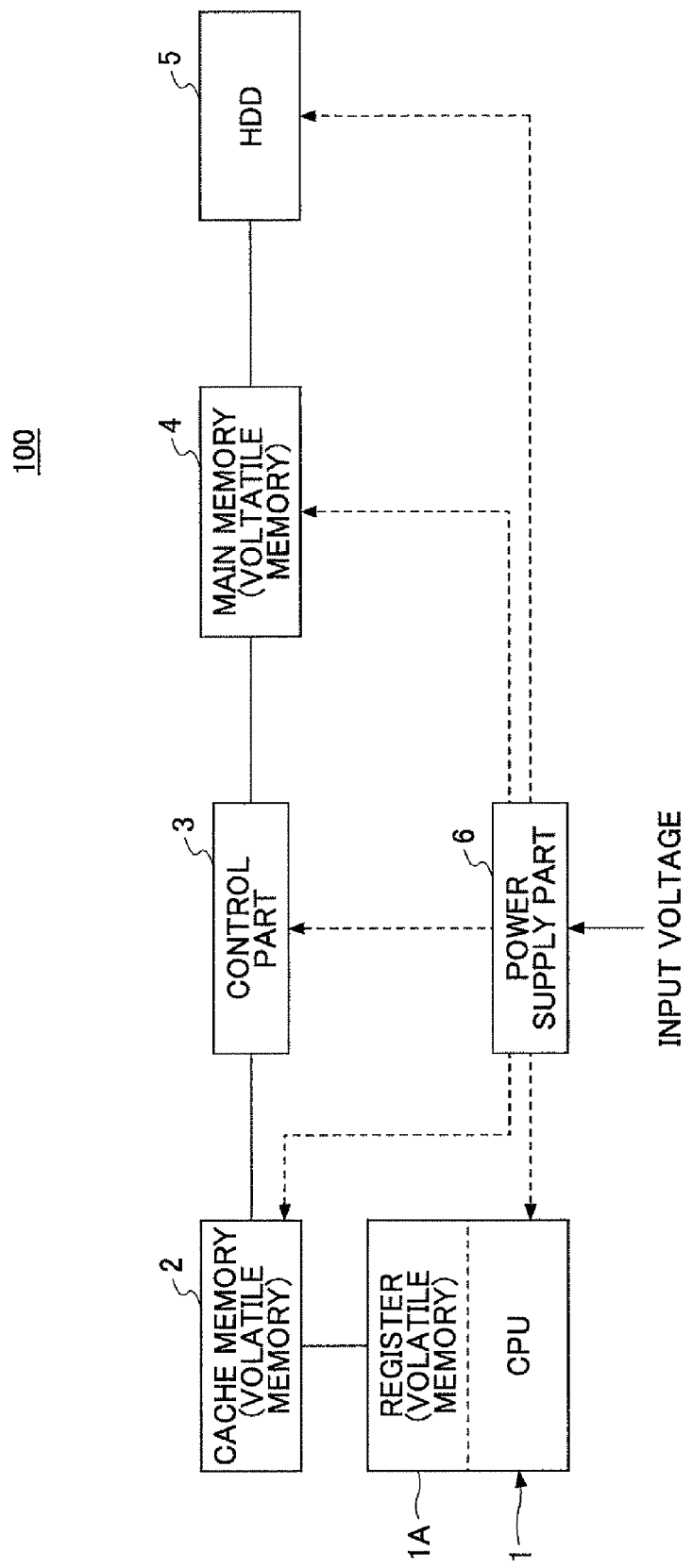
FIG. 1 is a schematic diagram illustrating a configuration of a data processing apparatus according to a related art example.
Figure 2:
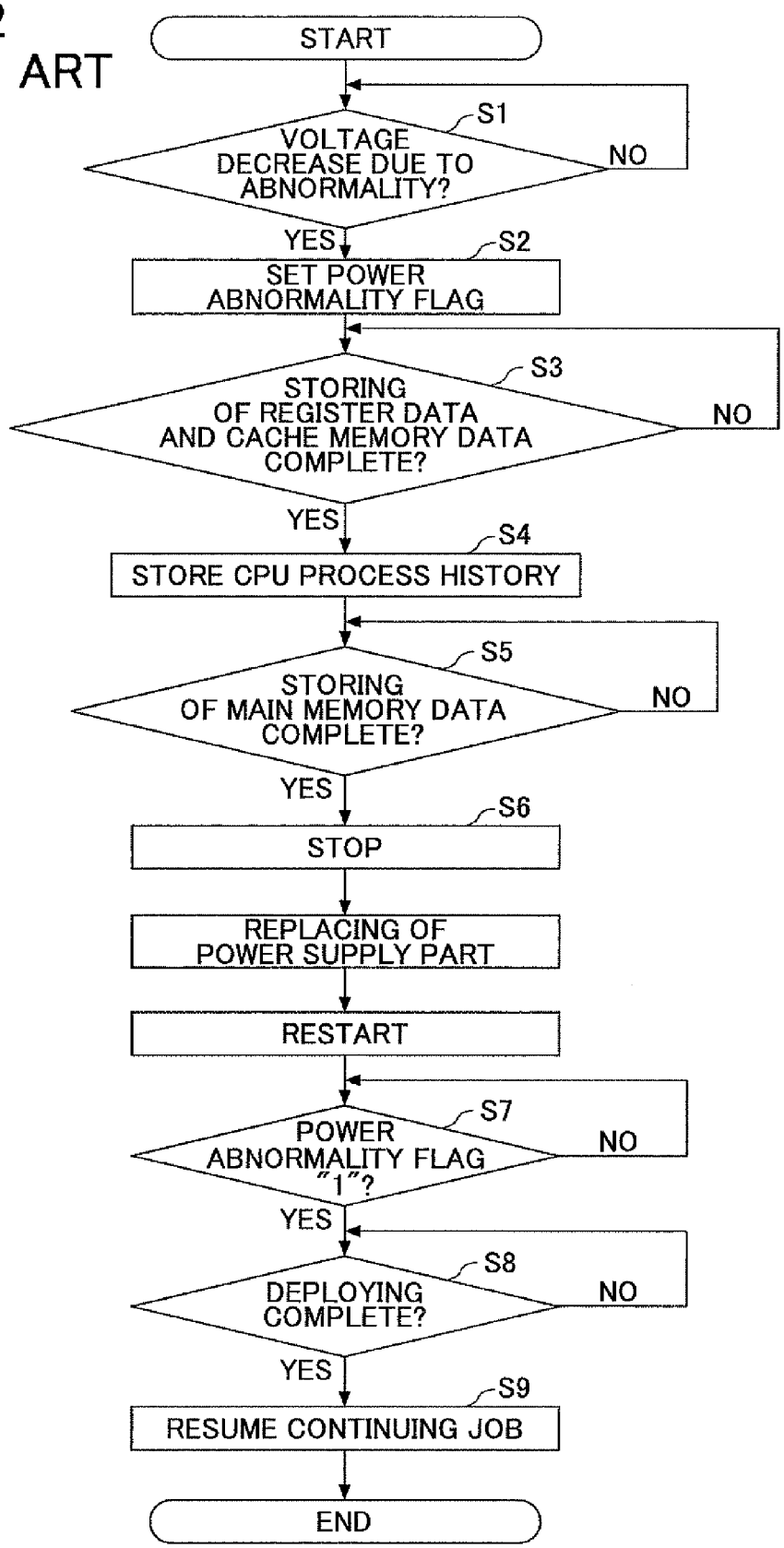
FIG. 2 is a flowchart for describing processes performed by a CPU where an abnormality occurs in a power supply system of the power supply part of a data processing apparatus according to a related art example.
Figure 3:
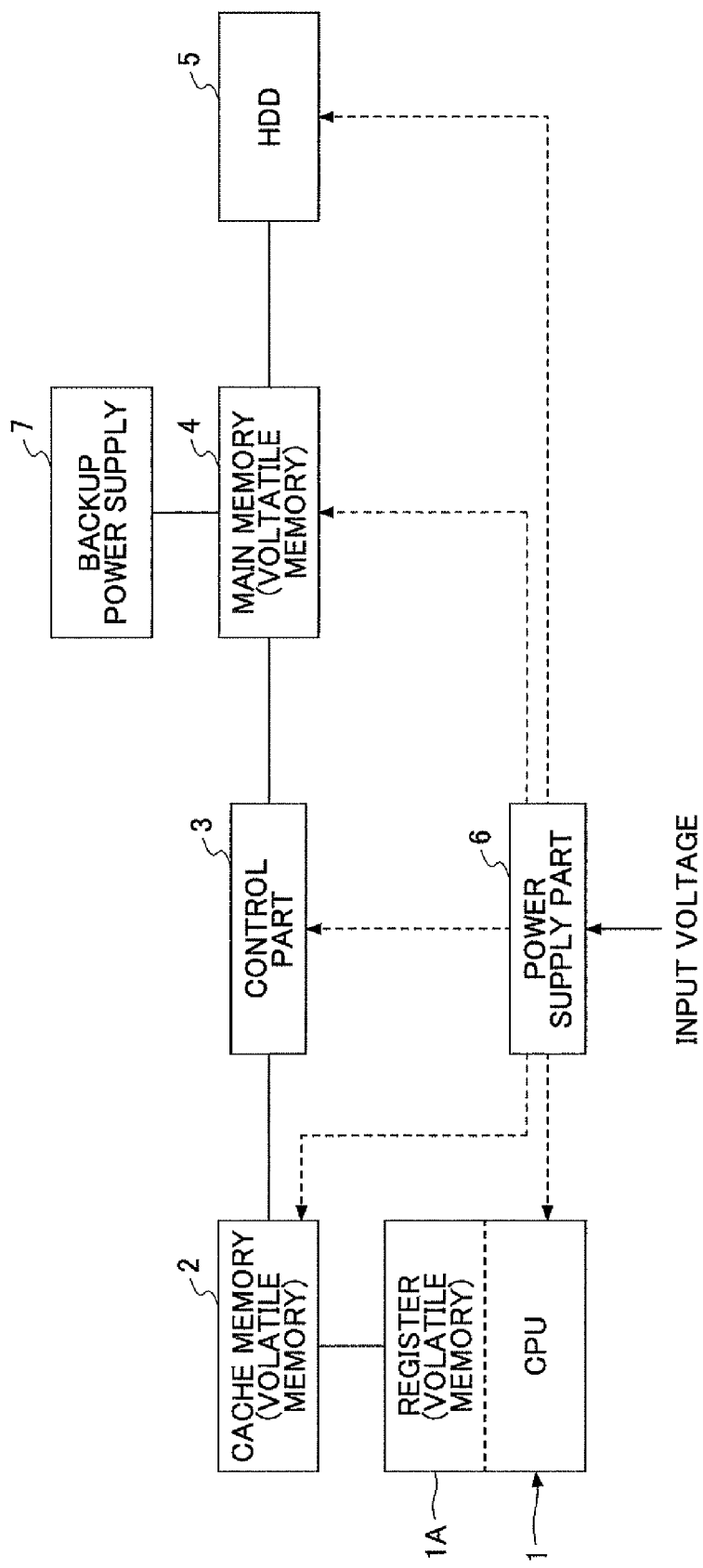
FIG. 3 is a schematic diagram illustrating a configuration of a data processing apparatus according to another related art example.
Figure 4:
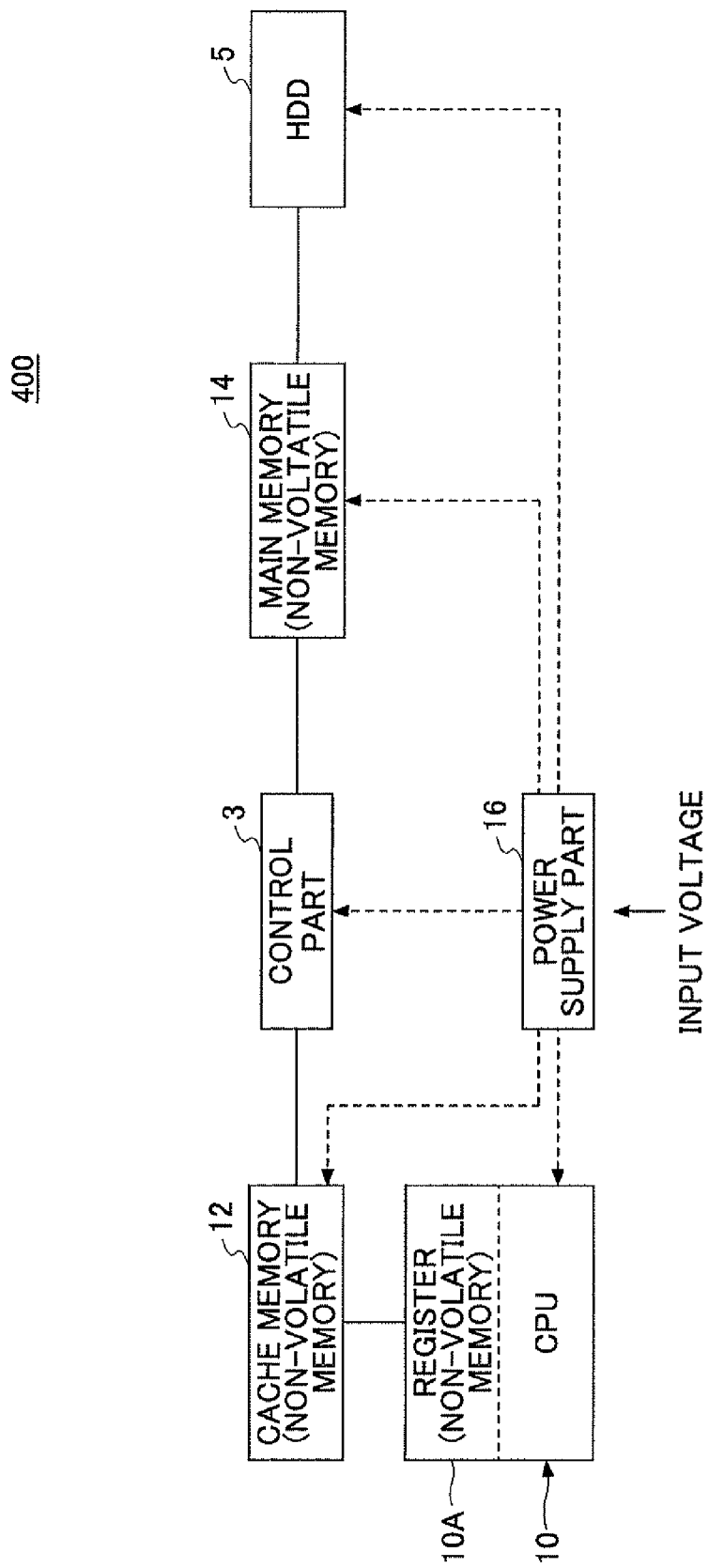
FIG. 4 is a block diagram illustrating a configuration of a data processing apparatus according to a first embodiment of the present invention.

FIG. 4 lock diagram illustrating a configuration of a data processing apparatus 400 according to a first embodiment of the present invention. In FIG. 4, like components are denoted by like reference numerals as of the above-described data processing apparatuses 100, 300 and are not further described.

The data processing apparatus 400 includes a CPU 10, a register 10A installed in the CPU 10, a cache memory 12, a control part 3, a main memory 14, a HDD 5, and a power supply part 16.

A MRG (Magnetoresistive Register) or a MRAM (Magnetoresistive Random Access Memory) may used as the register 10A. Since both the MRG and the MRAM are non-volatile memories, data can be stored in the MRG or the MRAM rather than volatizing (being lost) even where abnormality occurs in the power supply part 16. Other than the register 10A, the CPU 10 itself may be configured the same as the above-described CPU 1 of the data process apparatus 100, 300.

The MRAM may also be used as the cache memory 12. As described above, since the MRAM is a non-volatile memory, data can be stored in the MRAM without volatizing even where abnormality occurs in the power supply part 16 in the same manner as the register 10A.

A large capacity MRAM may be used as the main memory 14. As described above, since the MRAM is a non-volatile memory, data can be stored in the MRAM without volatizing even where abnormality occurs in the power supply part 16 in the same manner as the register 10A and the cache memory 12.

The power supply part 16 converts the voltage value of the voltage supplied from an external power supply and supplies electric power to the CPU 10, the register 10A, the cache memory 12, the control part 3, the main memory 14, and the HDD 5. The power supply part 16, unlike the power supply part 6, does not have a large capacity condenser (capacitor). It is to be noted that the voltage value of the power supply part 16 is constantly monitored by executing a program (monitoring program) with the CPU 10.

Figure 5:
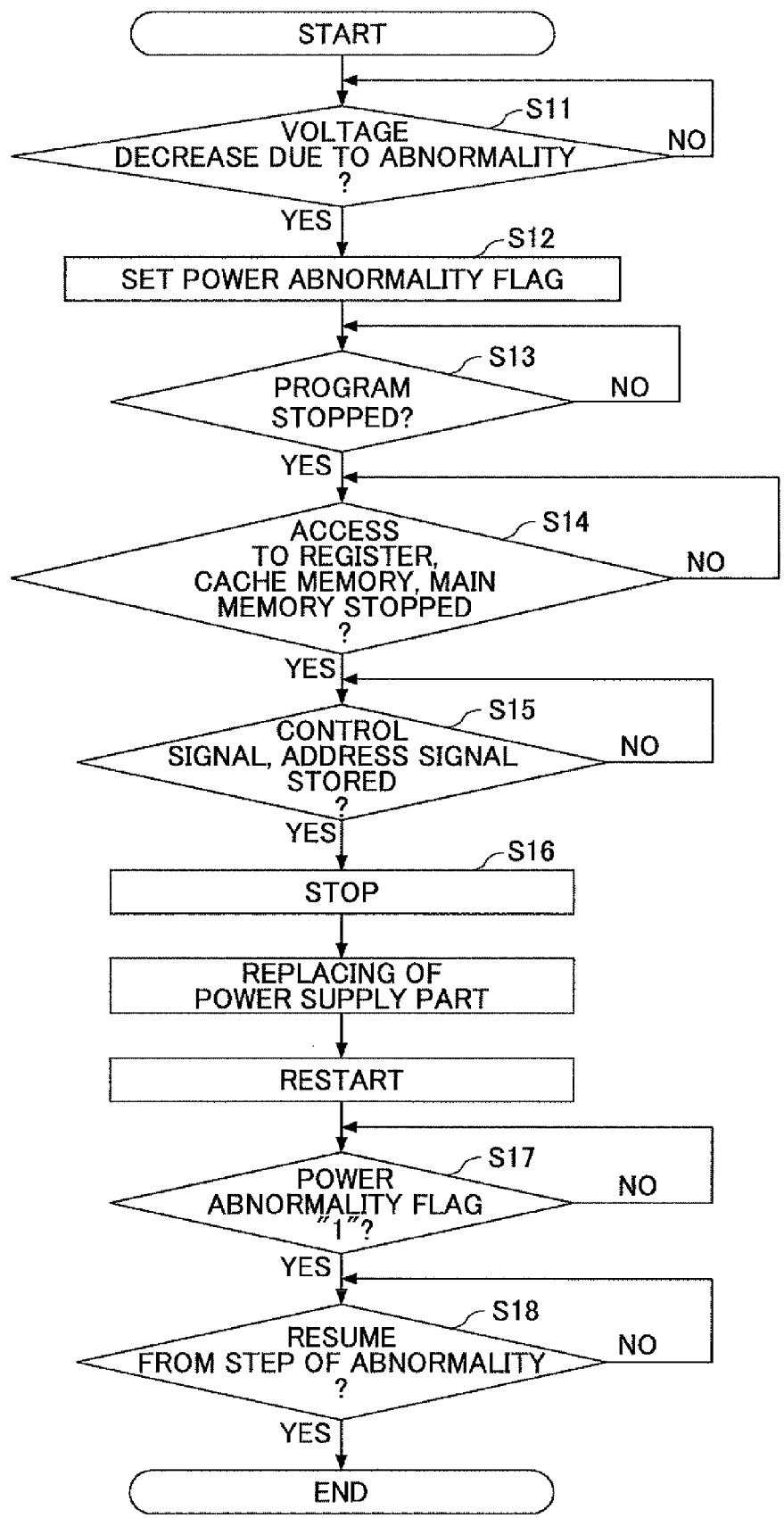
FIG. 5 is a flowchart for describing processes performed by a CPU where an abnormality occurs in a power supply part of a data processing apparatus according to the first, embodiment of the present invention.

FIG. 5 is a flowchart for describing processes performed by the CPU 10 where an abnormality occurs in the power supply part 16 of the data processing apparatus 400 according to the first embodiment of the present invention. The case where an abnormality occurs in the power supply part 16 includes, for example, a case where a malfunction or a power outage occurs.

The CPU 10 determines whether there is a decrease in the value of the voltage supplied from the power supply part 16 due to an abnormality (e.g., malfunction, power outage) based on the monitor results input from the power supply part 16 (Step S11). The step S11 is repeated until the decrease in the value of the voltage supplied from the power supply part 6 occurs.

In a case where the CPU 10 determines that there is a decrease in the value of the voltage supplied from the power supply part 16, the CPU 10 sets a power supply abnormality flag to "1" (Step S12).

The CPU 10 determines whether the monitoring program has been stopped (Step S13). The stopping of the monitoring program is executed by the CPU 10. Step S13 is repeated until the stopping of the program is confirmed by the CPU 10.

Then, the CPU 10 determines whether access to the register 10A, the cache memory 12, and the main memory 14 has been stopped (Step S14). The stopping of the access is executed by the CPU 10. Step S15 is repeated until the stopping of the access is confirmed by the CPU 10.

The CPU 10 determines whether control signals of the CPU 10 and address signals of the CPU 10 have been stored in the register 10A (Step S15). The storing of the control signals and the address signals is executed by the CPU 10. Step S15 is repeated until the storing of the control signals and the address signals is confirmed by the CPU 10.

Then, the CPU 10 stops all processes performed by the components included the data processing apparatus 400 (e.g. main memory 14, HDD 5, etc.,) (Step S16).

The processes are stopped for recovery (e.g., replacing, repairing) of the power supply part 16.

After the recovery (e.g., replacing or repairing) of the power supply part 16 is completed, the data processing apparatus 400 is restarted. When the data processing apparatus 400 is restarted, the CPU 1 determines whether the power supply abnormality flag is "1" (Step S17). Step S17 is for determining whether a decrease of the value of the voltage of the power supply part. 16 has occurred, previous to the restarting of the data processing apparatus 400.

The CPU 10 uses the data stored in the register 10A, the cache memory 12, and the main memory 14 (e.g., control signals of the CPU 10, address signals of the CPU 10) and determines whether the monitoring program that had been in execution until the occurrence of the abnormality in the power supply part 16 should be resumed from a step (continuing step) being executed when the abnormality occurred (Step S18). The processes of FIG. 5 are completed when the resumption of the program execution is confirmed by the CPU 10.

Accordingly, the processes of the CPU 10 where abnormality occurs in the power supply part 16 are completed.

With the data processing apparatus 400, data in the register 10A, the cache memory 12, and the main memory 14 can be saved without having to perform the above-described data saving process even in a case where abnormality of a power supply system of the power supply part 16 occurs because the register 10A, the cache memory 12, and the main memory 14 are non-volatile memories.

In reality, however, electric power is required until all processes of the components in the data processing apparatus 400 are stopped in a case where abnormality of the power supply part 16 occurs. Nevertheless, such electric power is a small amount. Such a small amount of power can be supplied using the power remaining in the power supply part 16. Therefore, unlike the power supply part 6, the power supply part 16 requires no large capacity condenser for maintaining power.

Next, an operation of the data processing apparatus 400 according to the first embodiment of the present invention is described with reference to FIGS. 6A-6C.

FIGS. 6A-6C are diagrams for describing an operation of the data processing apparatus 400 according to the first embodiment of the present invention. FIG. 6A is a diagram of a time line illustrating a characteristic of abnormality occurring in the power supply part 6 and 16. FIG. 6B is a diagram of a time line illustrating characteristics of a power source abnormality flag, activation of a program, activation of a data saving process, activation of a data deploying process, and activation of power maintenance according to the data processing apparatus 100, 300 according to the related art example. FIG. 6C is a diagram of a time line illustrating characteristics of a power source abnormality flag, activation of a program, and use of power remaining in the power supply part 16 according to an embodiment of the present invention.

[Operation of Data Processing Apparatus 100, 300 According to Related Art Example]

At the time "t=0" of FIG. 6B, the power supply abnormality flag is "0", the program is in an active (ON) state, the data saving process is not being performed (OFF), and the maintaining of power with the condenser of the power supply part 6 is not being performed (NO).

In a case where an abnormality occurs in the power supply part 6 at the time "t=t1" of FIG. 6A, the power supply abnormality flag is set to "1" at the time "t=t2". Accordingly, the data saving process is being performed (ON), and the maintaining of power with the condenser of the power supply part 6 is being performed (YES) as illustrated in FIG. 6B.

At the time "t=t3", the data saving process is completed (OFF) as illustrated in FIG. 6B. At the time "t=t4", the power maintaining process (backup process) using the condenser of the power supply part 6 is completed (NO) as illustrated in FIG. 6B.

At the time "t=t5", the voltage value of the power supply part 6 becomes lower than the voltage for operating the CPU 1, the register 1A, the cache memory 2, and the main memory 4 as illustrated in FIG. 6A. At the time "t=t6", the voltage value of the power supply part 6 becomes approximately zero.

Then, after the power supply part 6 is replaced or repaired, the voltage value of the power supply part 6 gradually increases from the time "t=t7".

When the CPU 1 is restarted at time "t=t8", the CPU 1 sets the power supply abnormality flag to "0" and executes the process of deploying the saved data (deploying process "ON") as illustrated in FIG. 6B.

After the deploying process is completed (deploying process "OFF") at time "t=t9", the CPU 1 continues the program by using the deployed data at time "t=t10".

Thereby, the operation of the data processing apparatus 100, 300 according to the related art examples is completed. It is to be noted that, in this example, the period of time t=t2 through t4 is approximately several seconds to several tens of seconds.

As described above, since the data processing apparatus 100, 300 needs to perform the data saving process and the data deploying process, the data processing apparatus 100, 300 cannot be promptly restarted. Further, the data processing apparatus 100, 300 requires a power supplying source for performing the data deploying process. Since a large capacity condenser is installed in the power supply part 6 as the power supplying source, size reduction of the data processing apparatuses 100, 300 is difficult and manufacturing cost is high.

[Operation of Data Processing Apparatus 400 According to First Embodiment]

At the time "t=0" of FIG. 6C, the power supply abnormality flag is "0", the program is in an active (ON) state, and the power maintained in the power supply part 16 is not being used (NO).

In a case where abnormality occurs in the power supply part 6 at the time "t=t1" of FIG. 6A, the power supply abnormality flag is set to "1" at the time "t=t2". Accordingly, a program is stopped (OFF). It is to be noted that all processes of the data processing apparatus 400 are stopped together with the stopping of the program.

During a period of approximately several milliseconds after the time "t=t2", the power remaining in the power supply part 16 is used for stopping the program and all of the processes of the data processing apparatus 400.

Then, after the power supply part 16 is replaced or repaired and the data processing apparatus 400 is restarted at the time "t=t8", the CPU 10 resumes the program from the step in which the abnormality of the power supply part 16 has occurred.

Accordingly, with the data processing apparatus 400 according to the first embodiment, in a case where the voltage value decreases due to abnormality of the power supply part 16, the CPU 10 simply prevents access to the register 10A, the cache memory 12, and the main memory 14 and stops the processes of the data processing apparatus 400.

Since the register 10A, the cache memory 12, and the main memory 14 are non-volatile memories, the data in the register 10A, the cache memory 12, and the main memory 14 can be maintained without having to perform the data saving process of the data processing apparatuses 100, 300 of the related art example.

Accordingly, with the data processing apparatus 400 according to the first embodiment, no data saving process as in the related art examples is required even in a case where an abnormality occurs in the power supply system of the power supply part 16.

Further, unlike the data processing apparatus 100, 300 of the related art examples, there is no need to deploy the data saved in the HDD 5 to the register 1A, the cache memory 2, and the main memory 4 after the data processing apparatus 400 is restarted.

After the data processing apparatus 400 is restarted, the CPU 10 continues the monitoring program by using respective data maintained in the register 10A, the cache memory 12, and the main memory 14 (e.g., control signals of the CPU 10, address signals of the CPU 10).

Accordingly, even in a case where abnormality in the power supply system, of the power supply part 16 occurs, the CPU 10 can recover in a short period of time and continue to perform the monitoring program. Such quick recovery allows a computer apparatus to promptly become available. This is advantageous for a data processing apparatus required to recover promptly such as a data processing apparatus for an institution used by many users.

Further, since the power supply part 16 does not need to maintain power for the register 10A, the cache memory 12, and the main memory 14 over a long period of time, no large capacity condenser is required to be installed in the power supply part 16.

Accordingly, the size of the power supply part 16 can be reduced. Thus, size reduction of the data processing apparatus 400 can be achieved. Further, the cost for deploying data can also be reduced.

Further, with the data processing apparatus 100, 300 of the related art examples, the data saving process cannot be performed in a case where abnormality (e.g., short circuiting) occurs in a condenser used for backup.

With the data processing apparatus 400 according to the first embodiment, data can be maintained without having to perform a data saving process since the register 10A, the cache memory 12, and the main memory 14 are all non-volatile memories. Accordingly, a highly reliable data processing apparatus 400 can be provided.

Although the program, which had been in execution at the time when the abnormality of the power supply part 16 occurred, is resumed by the CPU 10 from the step in which the abnormality had occurred, the CPU 10 may resume the program from one step prior to the step in which the abnormality had occurred.

Hence, since the power supply part 16 requires no large capacity condenser for maintaining power, an inexpensive data processing apparatus can be provided.

Although the first embodiment describes the data processing apparatus 400 as having the register 10A, the cache memory 12, and the main memory 14 that are all non-volatile memories and having no condenser for maintaining power, the data processing apparatus 400 is not limited to the above-described configuration of the first embodiment.

For example, a condenser for backup may be connected to the register 10A, the cache memory 12, and the main memory 14 from, an aspect, of not requiring performing both the data saving process and the data deploying process but rather achieving prompt recovery of the data processing apparatus 400. Further, among the register 10A, the cache memory 12, and the main memory 14, any one(s) of the register 10A, the cache memory 12, and the main memory 14 may be a non-volatile memory and the one(s) that is not a non-volatile memory (i.e. volatile memory) may be connected to a backup power supply.

[Second Embodiment]

FIG. 7 is a block diagram illustrating a configuration of a data processing apparatus 700 according to a second embodiment of the present invention. The data processing apparatus 700 of the second embodiment is different from the data processing apparatus 400 of the first embodiment in that the main memory 24 is a volatile memory which is connected to a backup power supply (e.g., backup battery). Other than such difference, the configuration of the data processing apparatus 700 is substantially the same as that of the data processing apparatus 400. Therefore, in the following description of the second embodiment and in FIG. 7, like components are denoted by like reference numerals as of the above-described data processing apparatus 400 of the first embodiment and are not further described.

In the data processing apparatus 700 according to the second embodiment, even in a case where an abnormality occurs in the power supply part 16, the data of the main memory 23 can be maintained by providing a backup power supply 7 in the data processing apparatus 700.

Accordingly, in the same manner as the first embodiment, the CPU 10 stops all of the processes and does not need to perform a data saving process. Thus, the time required for restarting the data processing apparatus 700 can be significantly reduced. Thus, the data processing apparatus 700 can recover in a short period of time and continue executing the program.

All examples and conditional language recited herein are intended for pedagogical purposes to aid the reader in understanding the invention and the concepts contributed by the inventor to furthering the art, and are to be construed as being without limitation, to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A data processing apparatus comprising:
a CPU including a register;
a cache memory;
a main memory configured to exchange data with the cache memory;
a control part configured to control the exchanging of data between the main memory and the cache memory; and
a power supply part configured to supply power to the register, the cache memory, and the main memory;

wherein the register, the cache memory, and the main memory are each configured to store data and maintain the stored data therein without being supplied with the power from the power supply part;

wherein the control part is configured to stop the CPU from accessing the register, the cache memory, and the main memory where an abnormality occurs in the power supply part;

wherein the cache memory is a non-volatile memory.

2. The data processing apparatus as claimed in claim 1, wherein the control part causes the CPU to resume processing of the stored data maintained by the register, the cache memory, and the main memory when the power supply part recovers after the occurrence of the abnormality.

3. The data processing apparatus as claimed in claim 1, wherein the CPU is configured to store control signals of the CPU and address signals of the CPU in the register when the abnormality occurs.

4. The data processing apparatus as claimed in claim 1, wherein the CPU is configured to execute a program including a plurality of steps and stop executing the program when the abnormality occurs, wherein the CPU is configured to resume the execution of the program when the power supply part recovers after the occurrence of the abnormality; wherein the execution of the program is resumed from a continuing step that had been in execution until the occurrence of the abnormality or from a step that is one step prior to the continuing step.

5. The data processing apparatus as claimed in 1, wherein the register, the cache memory, the main memory are each a non-volatile memory.

6. The data processing apparatus as claimed in 1, further comprising:

a backup power supply;

wherein the register, the main memory are each a volatile memory to which power is supplied from the backup power supply when the abnormality occurs.

* * * * *